(12) United States Patent
Choi et al.

(10) Patent No.: US 7,361,289 B2
(45) Date of Patent: Apr. 22, 2008

(54) GREEN LIGHT-EMITTING PHOSPHOR FOR VACUUM ULTRAVIOLET-EXCITED LIGHT-EMITTING DEVICE, LIGHT-EMITTING DEVICE INCLUDING THE SAME, AND METHOD OF PREPARING THE SAME

(75) Inventors: Ick-Kyu Choi, Suwon-si (KR); Seon-Young Kwon, Suwon-si (KR); Kyu-Chan Park, Suwon-si (KR); Yong-Seon Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 262 days.

(21) Appl. No.: 10/992,147

(22) Filed: Nov. 17, 2004

(65) Prior Publication Data

US 2005/0109987 A1    May 26, 2005

(30) Foreign Application Priority Data

Nov. 20, 2003    (KR) ............. 10-2003-0082686

(51) Int. Cl.
   *C09K 11/64* (2006.01)
   *C09K 11/62* (2006.01)
   *H01J 1/62* (2006.01)
   *H01J 61/44* (2006.01)

(52) U.S. Cl. ............... 252/301.4 R; 252/301.6 R; 313/582; 313/584; 313/486

(58) Field of Classification Search ......... 252/301.4 R, 252/301.6 R; 313/582, 584, 486
   See application file for complete search history.

(56) References Cited

U.S. PATENT DOCUMENTS

| | | | |
|---|---|---|---|
| 3,499,843 A * | 3/1970 | Van Noy et al. ...... 252/301.4 R |
| 4,085,351 A | 4/1978 | Takahashi et al. |
| 4,874,984 A * | 10/1989 | Sigai et al. ............. 313/486 |
| 5,868,963 A | 2/1999 | Thi et al. |
| 5,989,455 A | 11/1999 | Hisamune et al. |
| 6,423,248 B1 | 7/2002 | Rao et al. |
| 6,469,451 B2 * | 10/2002 | Mori ..................... 315/169.4 |
| 6,833,672 B2 * | 12/2004 | Aoki et al. ............. 313/582 |
| 6,982,046 B2 * | 1/2006 | Srivastava et al. .... 252/301.4 R |
| 2002/0149311 A1 * | 10/2002 | Justel et al. ............. 313/483 |
| 2005/0127811 A1 * | 6/2005 | Choi et al. ............. 313/486 |
| 2006/0152135 A1 * | 7/2006 | Choi et al. ............. 313/502 |

FOREIGN PATENT DOCUMENTS

EP    0 908 502 A1    4/1999

(Continued)

OTHER PUBLICATIONS

Phosphor Handbook, Shionya et al, 1999, p. 323-325.*
Korean Patent Abstract, Publication No. 1020010084379 A, Published Sep. 6, 2001, in the name of Seung Jae Lim.

(Continued)

*Primary Examiner*—C. Melissa Koslow
(74) *Attorney, Agent, or Firm*—Christie, Parker & Hale, LLP

(57) ABSTRACT

The present invention provides a green light-emitting phosphor for a light-emitting device excited by vacuum ultraviolet rays, a light-emitting device, and a method of preparing the same. The green light-emitting phosphor is represented by the formula $A_xB_{4-2x}O_{6-2x}:Mn_y$, wherein A is Mg, Zn, Ca, or Li, B is Al or Ga, $0.6 \leq x \leq 1.4$, and $0.01 \leq y \leq 0.1$. The phosphor has excellent brightness, color purity, and discharging characteristics, and a short decay time. In one embodiment, the phosphor has a stable spinel structure, and is stable with regard to external influence such as heat, ion bombardment, and vacuum ultraviolet rays. Longer-lived light-emitting devices are also disclosed.

21 Claims, 5 Drawing Sheets

FOREIGN PATENT DOCUMENTS

| | | | |
|---|---|---|---|
| JP | 2000-80363 | * | 3/2000 |
| JP | 2000-119647 | | 4/2000 |
| JP | 2001-329256 | | 11/2001 |
| JP | 2004-059615 | | 2/2004 |
| JP | 2005-025957 | | 1/2005 |

OTHER PUBLICATIONS

Korean Patent Abstract, Publication No. 1020030052407 A, Published Jun. 27, 2003, in the name of Yun Yeong Choi.

Patent Abstracts of Japan, Publication No. 2000-119647, Published Apr. 25, 2000, in the name of Watanabe et al.

Patent Abstracts of Japan, Publication No. 2001-329256, Published Nov. 27, 2001, in the name of Takagi et al.

Patent Abstracts of Japan, Publication No. 2004-059615, Published Feb. 26, 2004 in the name of Toda et al.

Patent Abstracts of Japan, Publication No. 2005-025957, Published Jan. 27, 2005, in the name of Setoguchi et al.

Toda, K., et al., "Green VUV Phosphor with Spinel Structure, $Mg_{1-x}Zn_xAl_{2-y}Ga_yO_4$:Mn", Journal of Materials Science Letters, vol. 22, pp. 979-980, 2003.

* cited by examiner

GREEN LIGHT-EMITTING PHOSPHOR FOR VACUUM ULTRAVIOLET-EXCITED LIGHT-EMITTING DEVICE, LIGHT-EMITTING DEVICE INCLUDING THE SAME, AND METHOD OF PREPARING THE SAME

CROSS-REFERENCE TO RELATED APPLICATION

This application claims priority of Korean patent application No. 10-2003-0082686, filed in the Korean Intellectual Property Office on Nov. 20, 2003, the entire disclosure of which is incorporated herein by reference.

BACKGROUND OF THE INVENTION (a) Field of the Invention

The present invention relates to a green light-emitting phosphor for a light-emitting device excited by vacuum ultraviolet rays, a light-emitting device using the same, and a method of preparing the same. More particularly, the present invention relates to a green light-emitting phosphor that is stable with regard to heat, ion bombardment, and vacuum ultraviolet rays, and which has excellent discharging characteristics.

(b) Description of the Related Art

A fluorescent display panel, particularly a plasma display panel, produces a visual display as a consequence of a gas discharge and generation of ultraviolet rays; phosphor excitation; and emission of visual light. Typically, a mixture of Ne and Xe gas is sealed between glass substrates. Electronic excitation (gas discharge) causes the gas mixture to emit vacuum ultraviolet rays (147 nm for Xe), which strike phosphors in the display panel, stimulating then to emit visual light. Phosphors used in other light-emitting devices, such as CRT's and fluorescent lamps, have been studied, and their use in plasma display panels has been considered. To use a phosphor in a plasma display panel, the phosphor must have excellent brightness, luminous efficiency, and color purity, as well as a short decay time, and it must not be easily degraded by heat or ultraviolet rays.

Currently, $Zn_2SiO_4$:Mn is the green light-emitting phosphor most commonly used in plasma display panels. $Zn_2SiO_4$:Mn has excellent brightness, a long decay time, and quickly saturated brightness when excited by vacuum ultraviolet rays, relative to a blue or red phosphor used in a plasma display panel. However, since $Zn_2SiO_4$:Mn has a higher dielectric constant than that of a blue or red phosphor, a higher discharge-inducing voltage is required to drive the plasma display panel. Therefore, green light-emitting phosphors of new compositions that satisfy all requirements of the plasma display panel have been researched.

The phosphors having new compositions typically include $BaAl_{12}O_{19}$:Mn (see U.S. Pat. Nos. 4,085,351, 5,868, 963, and 6,423,248), (Ba, Sr)$MgAl_{14}O_{23}$:Mn (see EP 0 908 502 A1), and magnetoplumbite ($AB_{12}O_{19}$)-type phosphors that use Mn as an activator or alkaline earth aluminate having a beta-alumina structure. However, although such phosphors have excellent color purity and decay characteristics relative to the $Zn_2SiO_4$:Mn phosphor, they also have low brightness and are more readily degraded by vacuum ultraviolet rays and heat. The result is shorter display life.

SUMMARY OF THE INVENTION

The present invention addresses these problems by providing a green light-emitting phosphor suitable for use in a light-emitting device, and which is excited by vacuum ultraviolet rays. The phosphor is stable with regard to heat, ion bombardment, and vacuum ultraviolet rays, and has excellent discharging characteristics.

In another aspect of the invention, a light-emitting device including the green light-emitting phosphor is provided. According to the invention, such a phosphor is represented by Formula 1, $$A_xB_{4-2x}O_{6-2x}:Mn_y \qquad (1)$$

wherein A is an element selected from the group consisting of Mg, Zn, Ca, and Li; B is an element selected from a group consisting of Al and Ga; $0.6 \leq x \leq 1.4$; and $0.01 \leq y \leq 0.1$.

In still another aspect of the invention, a method for preparing a green light-emitting phosphor is provided, and comprises the steps of uniformly mixing a manganese compound, a magnesium compound, an aluminum compound, and a flux; performing a first heat treatment of the mixture; and performing a second heat treatment under a reducing atmosphere.

BRIEF DESCRIPTION OF THE DRAWINGS

The accompanying drawings, which are incorporated in and constitute a part of the specification, illustrate embodiments of the invention, and together with the description, serve to illustrate the principles of the invention.

DETAILED DESCRIPTION OF THE INVENTION

Figure 1:
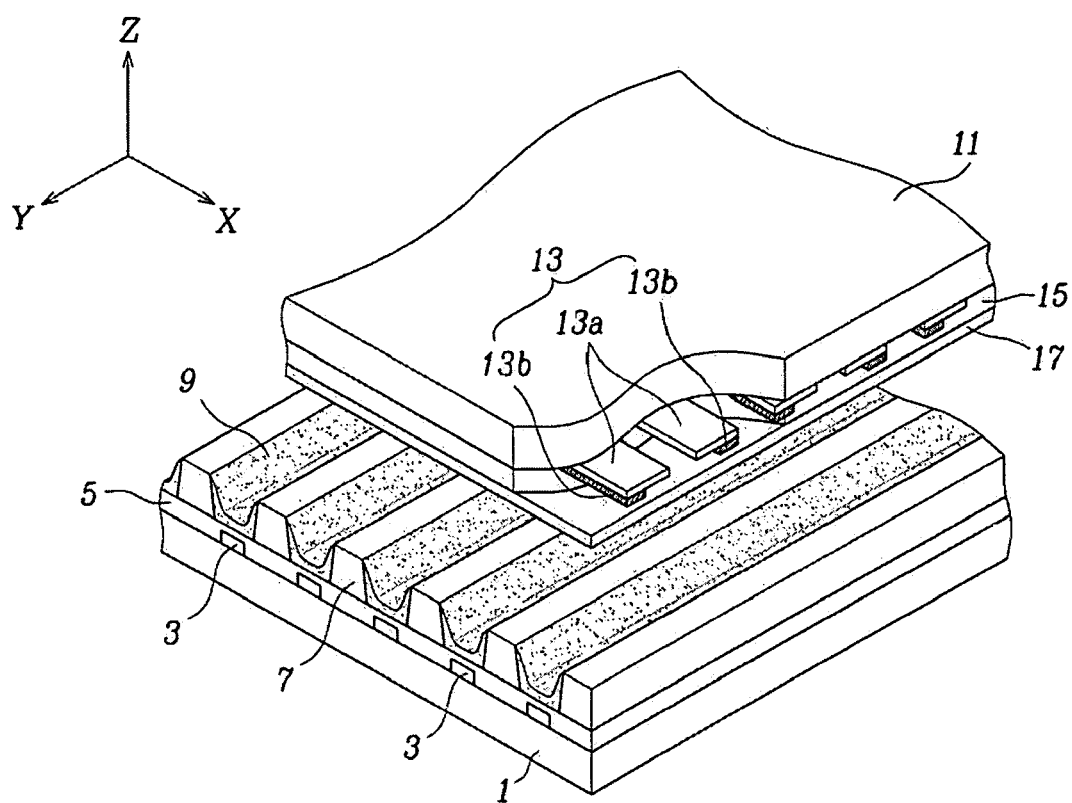
FIG. 1 is a partial exploded perspective view of a plasma display panel (PDP) according to an exemplary embodiment of the present invention.

According to a first aspect of the invention, a green light-emitting phosphor is provided, and comprises a phosphor represented by Formula 1:

$$A_xB_{4-2x}O_{6-2x}:Mn_y \qquad (1)$$

wherein A is an element selected from the group consisting of Mg, Zn, Ca and Li; B is an element selected from the group consisting of Al and Ga; $0.6 \leq x \leq 1.4$, preferably $0.8 \leq x \leq 1.3$; and $0.01 \leq y \leq 0.1$, preferably $0.01 \leq y \leq 0.05$. A preferred phosphor is a magnesium aluminate-based green light-emitting phosphor that is represented by Formula 2:

$$Mg_xAl_{4-2x}O_{6-2x}:Mn_y \qquad (2)$$

wherein $0.6 \leq x \leq 1.4$ preferably $0.8 \leq x \leq 1.3$ and $0.01 \leq y \leq 0.1$, preferably $0.01 \leq y \leq 0.05$.

Advantageously, a green light-emitting phosphor according to one embodiment of the invention shows a green emission band in the range of 515 to 525 nm when excited by vacuum ultraviolet rays, particularly vacuum ultraviolet rays of 147 nm and 173 nm generated by a plasma of a Xe-containing discharge gas. Preferably, the phosphor exhibits a green emission band having a maximum intensity at 520 nm.

In one embodiment, a green light-emitting phosphor according to the invention has a granularity of from 1 to 5 μm. If the granularity of the phosphor is less than 1 μm, the phosphor exhibits reduced brightness., whereas above 5 μm, the phosphor layer is difficult to fabricate.

Also according to one embodiment of the invention, a green light-emitting phosphor has a decay time of 4 to 9 ms. Furthermore, the phosphor has excellent brightness, color purity, and discharging characteristics.

In another aspect of the invention, a method of preparing a green light-emitting phosphor is provided. In particular, a transition metal, Mn, is added to a non-stoichiometric magnesium aluminate matrix or mixture. The phosphor can be prepared by the steps of uniformly mixing a manganese compound, a magnesium compound, an aluminum compound, and a flux; heat-treating the mixture; and then heat-treating the heat-treated mixture under a reducing atmosphere.

Non-limiting examples of magnesium compounds used to prepare the magnesium aluminate matrix include MgO, $MgCO_3$, $Mg(OH)_2$, and mixtures thereof. Preferably, the magnesium compound(s) includes MgO. Non-limiting examples of aluminum compounds include $Al_2O_3$, $Al(OH)_3$, and mixtures thereof. Non-limiting examples of manganese compounds (which provide the transition metal, Mn) include $MnCO_3$, MnO, $MnF_2$, $Mn(NO_3)_2$, $MnCl_2$, and mixtures thereof.

Non-limiting examples of the flux used to prepare a green light-emitting phosphor according to the invention include $AlF_3$, $MgF_2$, LiF, $Li_2(SO_4)$, and mixtures thereof.

In one embodiment of the invention, two heat treatment steps are performed. In the first heat treatment, the mixture of phosphor precursor compounds is heated to 1,400 to 1,650° C. for ten hours or less, preferably for two to ten hours. The first heat treatment is preferably performed under an air atmosphere, but it is not limited thereto. In the second heat treatment step, the temperature of the previously heat-treated mixture is adjusted to (or held at) 1,000 to 1,650° C. for three hours or less, preferably for one to three hours, under a reducing or inert atmosphere. To form the reducing or inert atmosphere during the second heat treatment, nitrogen and hydrogen gas are introduced, preferably in a volume ratio of from 100:0 to 80:20, preferably 100:2 to 90:10.

Advantageously, the preparative method just described optimizes the surface composition, granularity, and shape of the phosphor allowing the brightness, color purity, discharging characteristics, decay time, etc. of the green light-emitting phosphor to be maximized.

A green light-emitting phosphor of the present invention can be used as a green light-emitting phosphor of a light-emitting device, and particularly for a plasma display panel (PDP).

FIG. 1 is a partial exploded perspective view of a plasma display panel (PDP) according to an exemplary embodiment of the present invention.

Illustratively, the PDP includes a first substrate 1 and a second substrate 11 provided opposing one another with a predetermined gap therebetween. Address electrodes 3 are formed in a striped pattern on a surface of the first substrate 1 opposing the second substrate 11. Long axes of the address electrodes 3 are positioned along one direction (direction Y). A dielectric layer 5 is formed over an entire surface of the first substrate 1 on which the address electrodes 3 are provided to cover the same. Barrier ribs 7 are formed on the dielectric layer 5. The barrier ribs 7 are formed in a striped pattern similar to the address electrodes 3, but are positioned to correspond to locations between the address electrodes 3. Red (R), green (G), and blue (B) phosphor layers 9 are formed between the barrier ribs 7. In one embodiment, the phosphor layers 9 also cover opposing surfaces of the barrier ribs 7.

Formed on a surface of the second substrate 11 opposing the first substrate 1 are discharge sustain electrodes 13. The discharge sustain electrodes 13 are comprised of transparent electrodes 13a and bus electrodes 13b, both of which are formed in a striped pattern having long axes that are positioned along a direction (direction X) substantially perpendicular to the long axes of the address electrodes 3. A dielectric layer 15 is formed over an entire surface of the second substrate 11 on which the discharge sustain electrodes 13 are provided to cover the same. A protection layer 17 is formed covering the dielectric layer 15. In one embodiment, MgO is included in or used to produce the protection layer 17.

Areas where the address electrodes 3 and the discharge sustain electrodes 13 intersect define discharge cells. Discharge gas is filled in the discharge cells. Illustrative discharge gases include Xe and Ne. However, other suitable gases known to a person skilled in the art may be used.

In use, an address discharge is created by applying an address voltage Va between one of the address electrodes 3 and one of the discharge sustain electrodes 13. A sustain voltage Vs is then applied between a pair of the discharge sustain electrodes 13 to create a sustain discharge such that ultraviolet rays emitted by the plasma excite the corresponding phosphor layer 9. This phosphor layer 9 emits visible light that passes through the transparent second substrate 11.

The display panel including the green light-emitting phosphor of the present invention can prevent degradation of the phosphor, and has excellent luminous efficiency and a wide color reproduction range. Thus, the new phosphor offers the advantage of a longer-lived display panel without loss of performance.

A green light-emitting phosphor of the present invention can also be used for an LED (light emitting diode) backlight on a liquid crystal display (LCD), etc.

The following are non-limiting examples of the invention.

EXAMPLES 1 to 19

Mixtures of MgO, $Al_2O_3$, and $MnCO_3$ were prepared by charging a mixer with the mole ratio of reactants shown in Table 1, according to the formula: $xMgO+(2-x) Al_2O_3+yMnCO_3$. After adding 0.1 mol % of $MgF_2$ as the flux, the mixture was mixed for five hours. The mixture was then put in a melting pot and heated at a temperature of 1550° C. on an electric stove for six hours. After the first heat treatment was completed, the resultant mixture was processed at 1550° C. for two hours under a reducing atmosphere ($N_2$:$H_2$ volume ratio of 95:5), and a green light-emitting phosphor powder was obtained. The phosphor powder, glass balls, and distilled water were mixed at a ratio of 1:4:2, and the mixture was milled at 150 rpm for four hours, then dried, to prepare a green light-emitting phosphor powder having a granularity of 5 μm or less.

Using a Xe lamp, the green light-emitting phosphors prepared according to Examples 1 to 19, and also a green light-emitting phosphor of Comparative Example 1 ($Zn_2SiO_4$:Mn), were irradiated with 147 nm vacuum ultraviolet radiation, and their respective properties of relative intensity, chromatic coordinate, and decay time were measured. The results are described in Table 1.

TABLE 1

| Classification | Composition Ratio | | Relative Intensity | Color Coordinate | | Decay Time (10 %)(ms) |
| --- | --- | --- | --- | --- | --- | --- |
| | x | y(mol %) | | x coordinate | y coordinate | |
| Example 1 | 0.60 | 1.0 | 70 | 0.174 | 0.743 | 8 |
| Example 2 | 0.80 | 1.0 | 80 | 0.175 | 0.742 | 8 |
| Example 3 | 0.90 | 1.0 | 85 | 0.176 | 0.741 | 8 |
| Example 4 | 0.94 | 0.5 | 98 | 0.178 | 0.742 | 9 |
| Example 5 | 0.94 | 1.0 | 100 | 0.181 | 0.744 | 7 |
| Example 6 | 0.94 | 2.0 | 98 | 0.190 | 0.742 | 7 |
| Example 7 | 0.94 | 3.0 | 98 | 0.195 | 0.740 | 7 |
| Example 8 | 0.94 | 5.0 | 94 | 0.211 | 0.734 | 6 |
| Example 9 | 0.98 | 0.5 | 91 | 0.177 | 0.746 | 8 |
| Example 10 | 0.98 | 1.0 | 97 | 0.182 | 0.745 | 7 |
| Example 11 | 0.98 | 2.0 | 91 | 0.192 | 0.741 | 6 |
| Example 12 | 1.00 | 0.5 | 97 | 0.176 | 0.751 | 8 |
| Example 13 | 1.00 | 1.0 | 98 | 0.181 | 0.749 | 7 |
| Example 14 | 1.00 | 2.0 | 83 | 0.195 | 0.744 | 7 |
| Example 15 | 1.03 | 1.0 | 87 | 0.185 | 0.745 | 8 |
| Example 16 | 1.06 | 1.0 | 79 | 0.191 | 0.744 | 7 |
| Example 17 | 1.10 | 1.0 | 68 | 0.195 | 0.743 | 8 |
| Example 18 | 1.20 | 1.0 | 52 | 0.203 | 0.744 | 8 |
| Example 19 | 1.40 | 1.0 | 40 | 0.210 | 0.746 | 8 |
| Comparative Example 1 | $Zn_2SiO_4$:Mn | | 90 | 0.251 | 0.701 | 12 |
| Comparative Example 2 | 0.50 | 1.0 | 40 | 0.172 | 0.745 | 8 |
| Comparative Example 3 | 0.50 | 2.0 | 38 | 0.174 | 0.741 | 7 |
| Comparative Example 4 | 1.60 | 1.0 | 30 | 0.212 | 0.742 | 8 |
| Comparative Example 5 | 1.60 | 2.0 | 25 | 0.214 | 0.740 | 7 |

The relative intensity in Table 1 represents the ratio of maximum value of the PL (photoluminescence) emission spectrum when 147 nm wavelength light is the excitation source. Here, the relative intensity of Table 1 shows ratios of relative intensity when the relative intensity value of Example 5 is 100 as a standard. As shown in Table 1, it can be seen that the green light-emitting phosphors of Examples 1 to 19 prepared according to the present invention have excellent color purity and decay characteristics compared with the green light-emitting phosphor of Comparative Example 1. For example, the x and y CIE chromatic coordinate values of Example 5 are 0.181 and 0.737, respectively, as compared with 0.251 and 0.701, respectively, for Comparative Example 1. From these results, it can be seen that the green light-emitting phosphors of Examples 1 to 19 exhibit excellent color purity values compared with those of Comparative Example 1. When the values x and y are out of the above limited range, $0.6 \leq x \leq 1.4$ and $0.01 \leq y \leq 0.1$ in Comparative Examples 2 to 5, the relative intensity decreases significantly.

Figure 2:
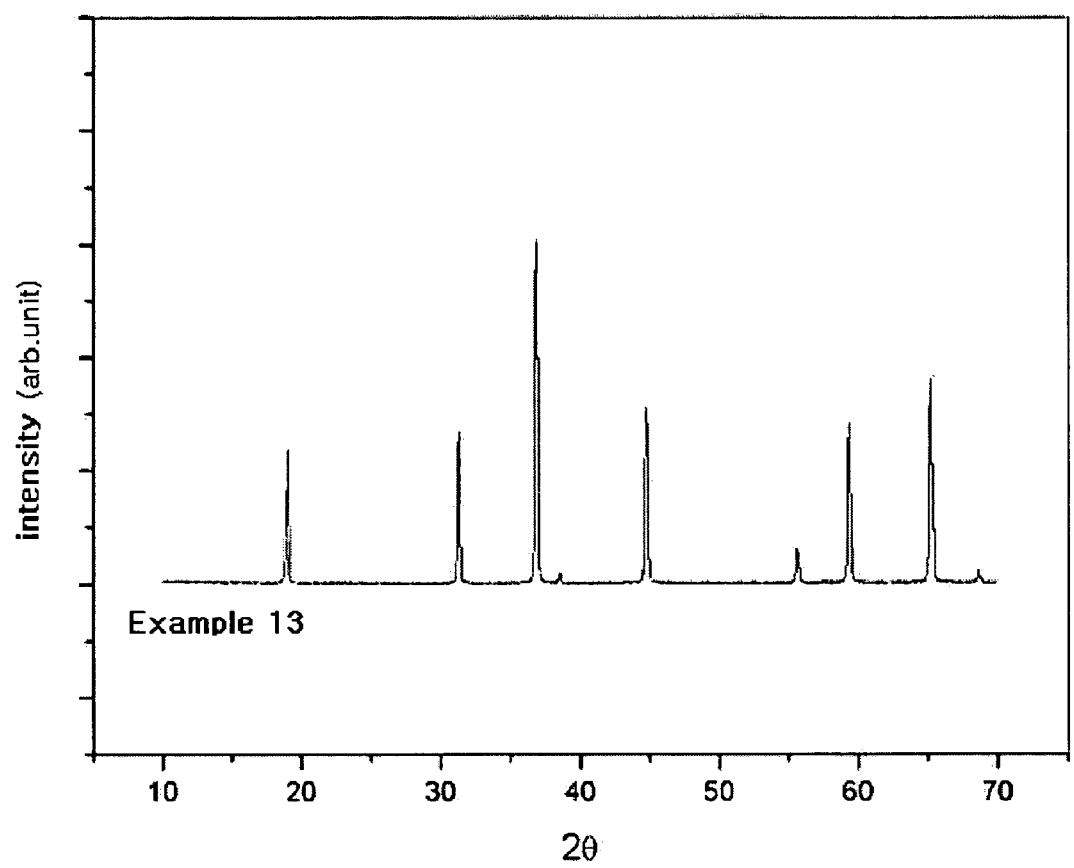
FIG. 2 is an x-ray diffraction pattern of a green light-emitting phosphor prepared according to Example 13.

FIG. 2 is a drawing showing an X-ray diffraction pattern of the green light-emitting phosphor prepared according to Example 13. As shown in FIG. 2, it can be seen that the main phase of the green light-emitting phosphor prepared according to Example 13 is a spinel ($MgAl_2O_4$) phase.

Figure 3:
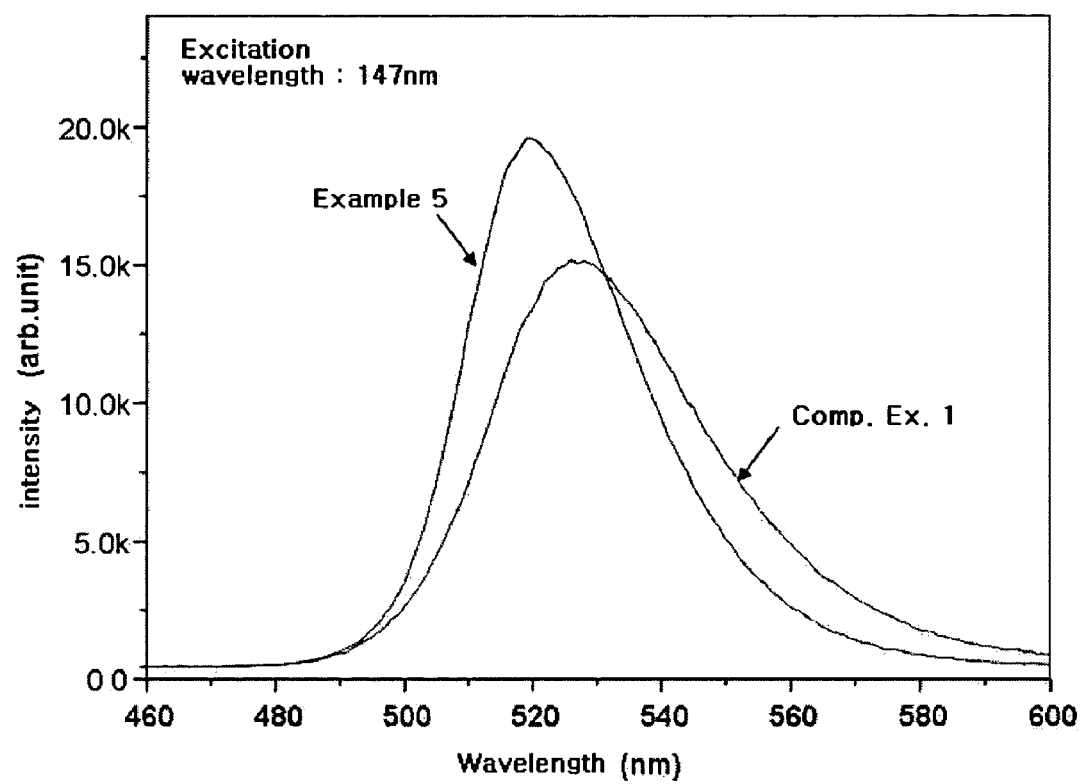
FIG. 3 is a photoluminescence (PL) emission spectrum for green light-emitting phosphors prepared according to Example 5 and Comparative Example 1, when excited with 147 nm light.
Figure 4:
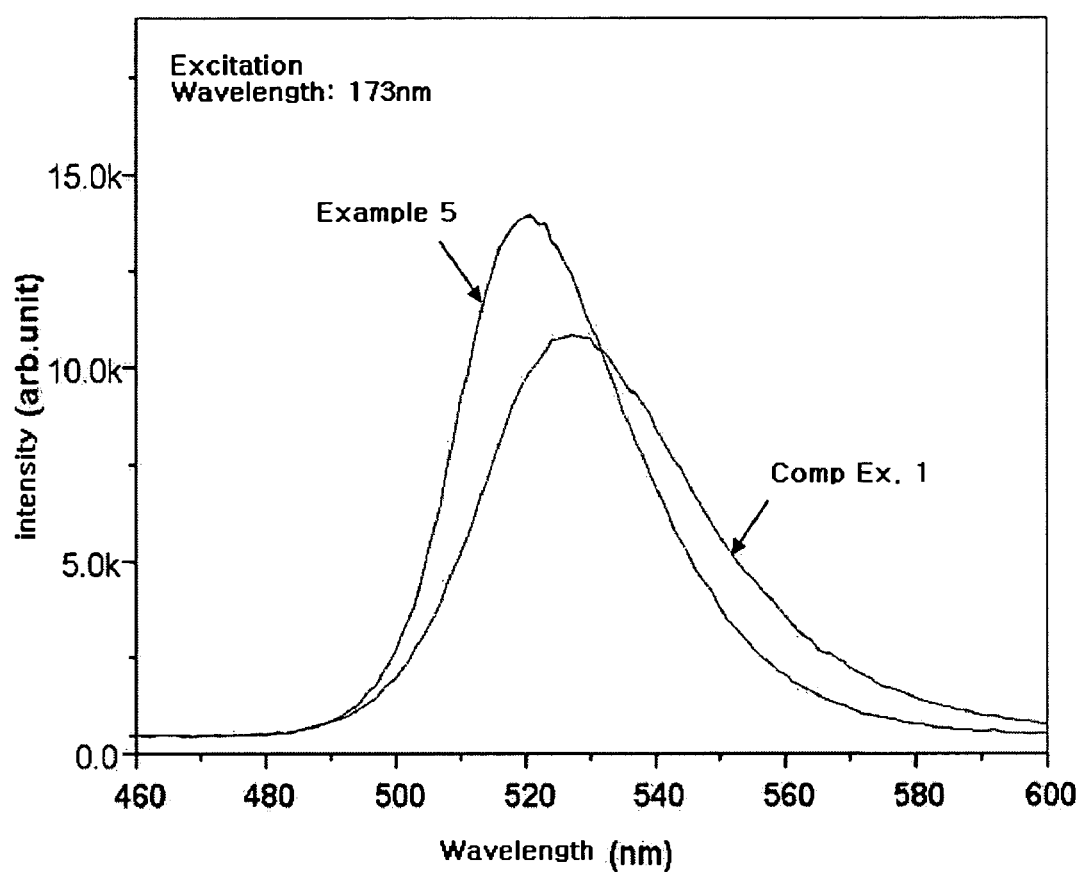
FIG. 4 is a PL emission spectrum for green light-emitting phosphors prepared according to Example 5 and Comparative Example 1, when excited with 173 nm light.

FIG. 3 is a PL (photoluminescence) emission spectrum for the green light-emitting phosphors prepared according to Example 5 and Comparative Example 1, using 147 nm light for excitation. FIG. 4 is a PL emission spectrum for the green light-emitting phosphors prepared according to Example 5 and Comparative Example 1, using 173 nm light for excitation.

As shown in FIGS. 3 and 4, the green light-emitting phosphor prepared according to Example 5 exhibited an emission band with its maximum value at 520 nm when it was excited by an excitation light of 147 nm and 173 nm. On the other hand, the $Zn_2SiO_4$ phosphor of Comparative Example 1 showed an emission band with its maximum value at 527 nm when it was excited by an excitation light of 147 nm and 173 nm, and it can be seen that the width of this emission band is relatively broader than the emission band of Example 5. As a result, it can be seen that the green light-emitting phosphor prepared according to Example 5 of the present invention exhibits an increase in luminous brightness of about 10% over that of the $Zn_2SiO_4$:Mn phosphor of Comparative Example 1.

Figure 5:
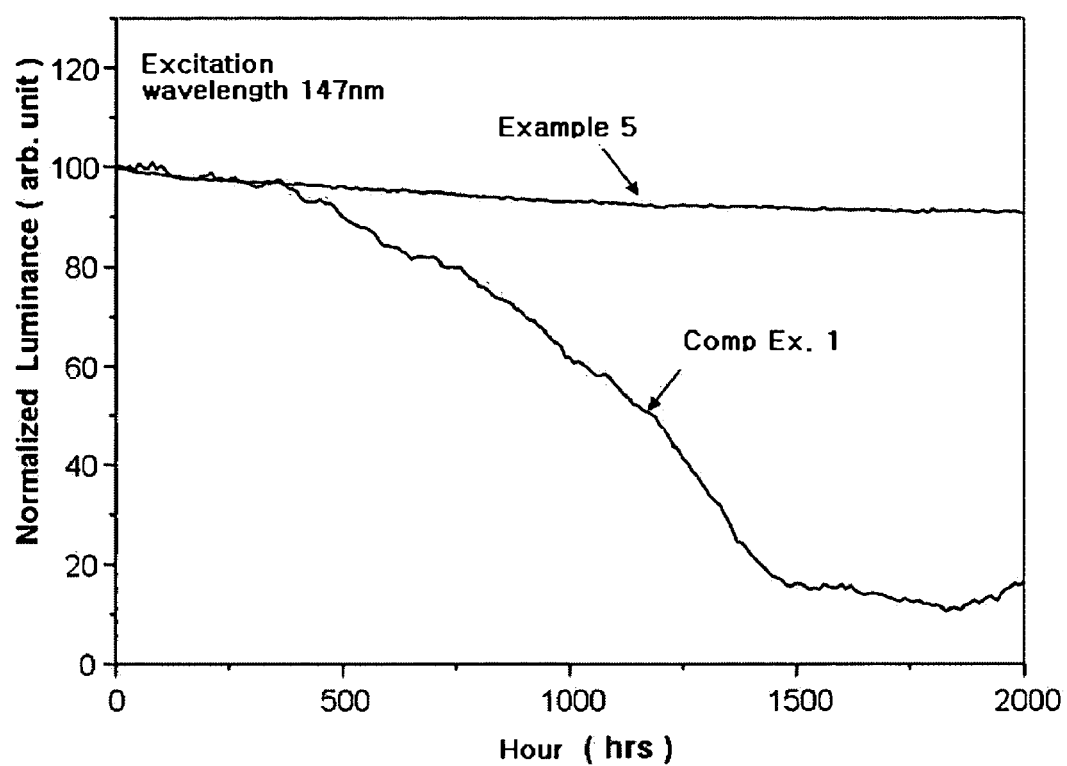
FIG. 5 is a 2000 hours life graph for green light-emitting phosphors prepared by Example 5 and Comparative Example 1, when excited with 147 nm light.

FIG. 5 is a life graph of 2000 hours for the green light-emitting phosphors prepared according to Example 5 and Comparative Example 1, measured using an excitation light of 147 nm. As shown in FIG. 5, the green light-emitting phosphor prepared according to Example 5 exhibited substantial luminance for the duration of the test, and therefore has superior longevity as compared with Comparative Example 1.

The phosphor according to the present invention is a green light-emitting phosphor suitable for use in a light-emitting device, and is excited by vacuum ultraviolet rays. Its brightness is increased by about 10% compared with the commonly used $Zn_2SiO_4$:Mn phosphor, and it has excellent color purity and decay characteristics. With a spinel structure, it should be very stable with regard to external influences such as heat, ion bombardment, and vacuum ultraviolet rays. Therefore, when the green light-emitting phosphor is used in a light-emitting device and is excited by vacuum ultraviolet rays, particularly in a plasma display panel, it should maintain panel performance for a long time, as well as increase the luminous efficiency and width of the panel's color reproduction range.

While the present invention has been described in detail with reference to various examples and embodiments, those skilled in the art will appreciate that various modifications and substitutions can be made thereto without departing from the spirit and scope of the present invention, as set forth in the appended claims.

What is claimed is:

1. A green light-emitting phosphor, comprising:
a phosphor represented by Formula 1

$$A_xB_{4-2x}O_{6-2x}:Mn_y \quad (1)$$

wherein A is an element selected from the group consisting of Mg, Zn, Ca, and Li; B is an element selected from the group consisting of Al and Ga; $0.6 \leq x \leq 0.98$; and $0.01 \leq y \leq 0.1$.

2. A green light-emitting phosphor of claim 1, wherein the phosphor is represented by Formula 2

$$Mg_xAl_{4-2x}O_{6-2x}:Mn_y \quad (2)$$

wherein $0.6 \leq x \leq 0.98$ and $0.01 \leq y \leq 0.1$.

3. A green light-emitting phosphor of claim 1, wherein the phosphor has a granularity of 1 to 5 μm.

4. A green light-emitting phosphor of claim 1, wherein the phosphor has a spinel structure.

5. A green light-emitting phosphor of claim 1, wherein the phosphor has a decay time of 4 to 9 ms.

6. A green light-emitting phosphor of claim 1, wherein the phosphor shows a green emission band in the range of 515 to 525 nm when irradiated by ultraviolet rays having wavelengths of 147 nm and 143 nm.

7. A light-emitting device, comprising:
a phosphor that emits green light when excited by vacuum ultraviolet rays, the phosphor being represented by Formula 1

$$A_xB_{4-2x}O_{6-2x}:Mn_y \quad (1)$$

wherein A is an element selected from the group consisting of Mg, Zn, Ca and Li; B is an element selected from the group consisting of Al and Ga; $0.6 \leq x \leq 0.98$; and $0.01 \leq y \leq 0.1$.

8. The light-emitting device of claim 7, wherein the green light-emitting phosphor is represented by Formula 2

$$Mg_xAl_{4-2x}O_{6-2x}:Mn_y \quad (2)$$

wherein $0.6 \leq x \leq 0.98$ and $0.01 \leq y \leq 0.1$.

9. The light-emitting device of claim 7, wherein the phosphor has a granularity of 1 to 5 μm.

10. The light-emitting device of claim 7, wherein the phosphor has a spinel structure.

11. The light-emitting device of claim 7, wherein the phosphor has a decay time of 4 to 9 ms.

12. The light-emitting device of claim 7, wherein the phosphor shows a green emission band in the range of 515 to 525 nm when excited by ultraviolet rays having wavelengths of 147 nm and 143 nm.

13. The light-emitting device of claim 7, wherein the device is a plasma display panel.

14. A method for preparing a green light-emitting phosphor, comprising:
uniformly mixing a manganese compound, a magnesium compound, an aluminum compound, and a flux;
performing a first heat-treatment on the mixture; and
performing a second heat-treatment on the mixture under a reducing or inert atmosphere,
wherein the green light-emitting phosphor is represented by Formula 1

$$A_xB_{4-2x}O_{6-2x}:Mn_y \quad (1)$$

wherein A is an element selected from the group consisting of Mg, Zn, Ca and Li; B is an element selected from the group consisting of Al and Ga; $0.6 \leq x \leq 0.98$; and $0.01 \leq y \leq 0.1$.

15. The method of claim 14, wherein the manganese compound is selected from the group consisting of $MnCO_3$, MnO, $MnF_2$, $Mn(NO_3)_2$, $MnCl_2$, and mixtures thereof.

16. The method of claim 14, wherein the magnesium compound is selected from the group consisting of MgO, $MgCO_3$, $Mg(OH)_2$, and mixtures thereof.

17. The method of claim 14, wherein the aluminum compound is selected from the group consisting of $Al_2O_3$, $Al(OH)_3$, and mixtures thereof.

18. The method of claim 14, wherein the flux is selected from the group consisting of $AlF_3$, $MgF_2$, LiF, $Li_2(SO_4)$, and mixtures thereof.

19. The method of claim 14, wherein the first heat-treatment is performed at a temperature of 1400 to 1650° C. for 10 hours or less.

20. The method of claim 14, wherein the second heat-treatment is performed at a temperature of 1000 to 1650° C. for 3 hours or less.

21. The method of claim 14, wherein the reducing atmosphere comprises nitrogen gas ($N_2$) and hydrogen gas ($H_2$) mixed in a volume ratio of 100:0 to 80:20.

* * * * *